March 26, 1935.   E. V. J. TOWER   1,995,406
AUTOMATIC FRICTION CLUTCH
Filed Aug. 18, 1931   4 Sheets-Sheet 2

INVENTOR
Elmer V. J. Tower
BY
ATTORNEYS

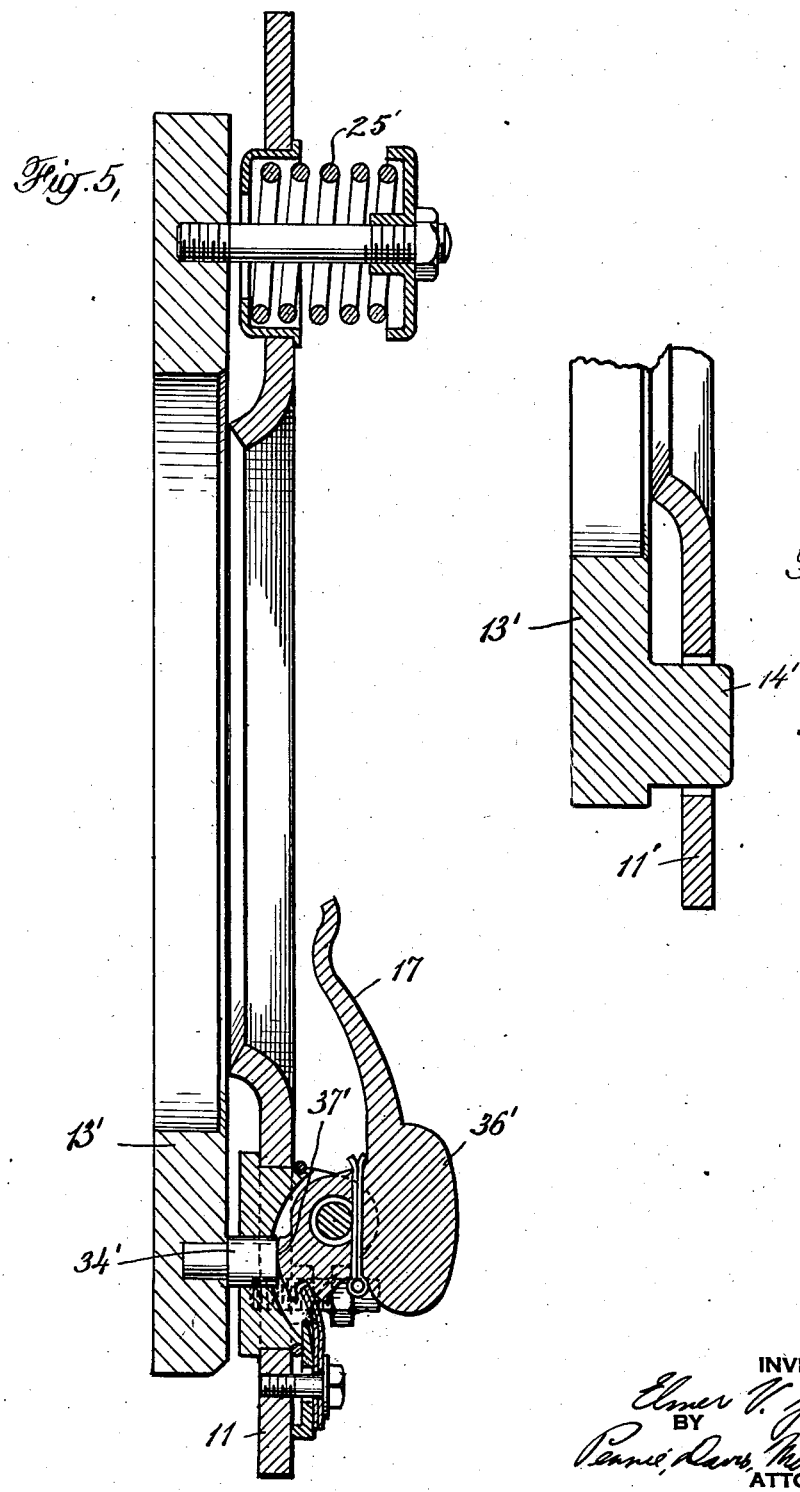

March 26, 1935.  E. V. J. TOWER  1,995,406
AUTOMATIC FRICTION CLUTCH
Filed Aug. 18, 1931   4 Sheets-Sheet 4
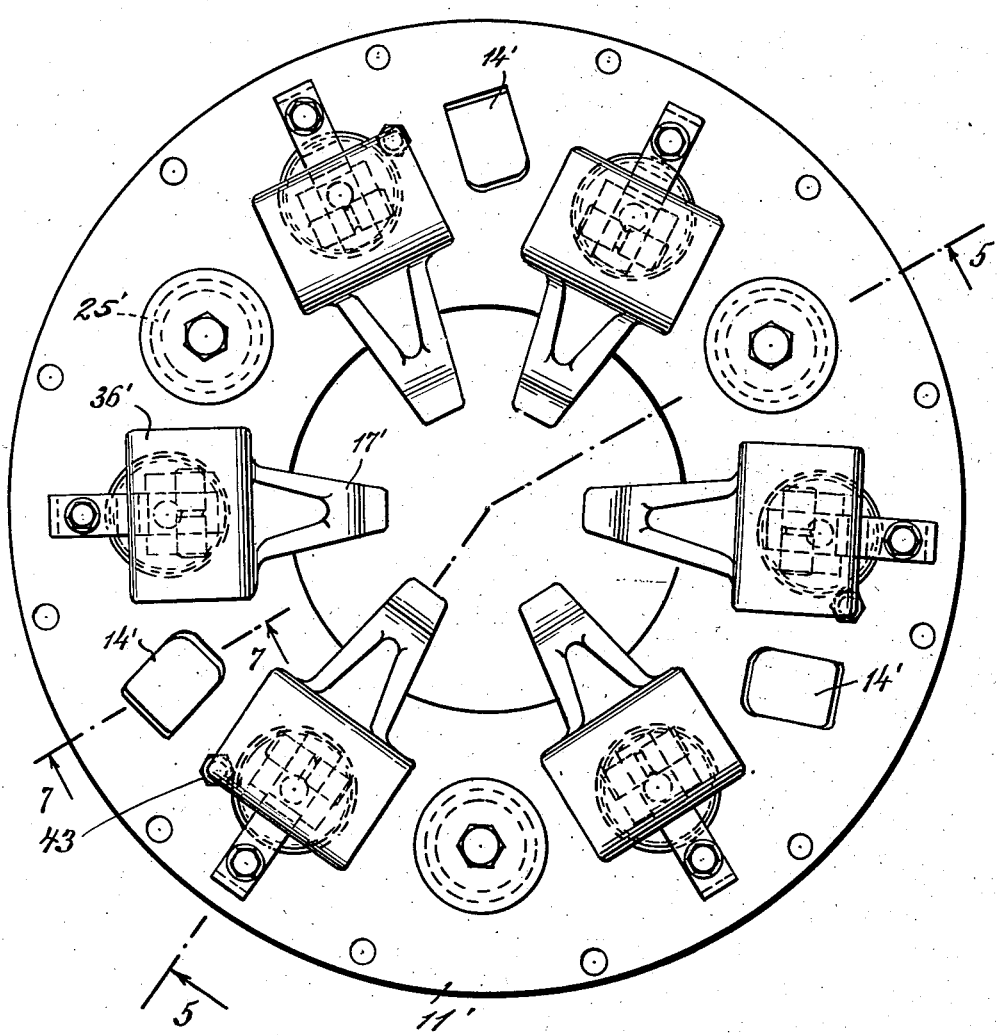
Fig. 6,
INVENTOR
BY
ATTORNEYS Patented Mar. 26, 1935

1,995,406

UNITED STATES PATENT OFFICE 1,995,406

AUTOMATIC FRICTION CLUTCH

Elmer V. J. Tower, North Syracuse, N. Y., assignor, by mesne assignments, to The Russell Manufacturing Company, Middletown, Conn., a corporation of Connecticut Application August 18, 1931, Serial No. 557,794

1 Claim. (Cl. 192—105)

This invention relates to automatic friction clutches of the well known type in which the clutch elements comprise a driving member and a driven member normally disengaged, and with centrifugal weights or elements which are connected with the driving member and operate upon the rotation thereof to cause engagement between the driving and the driven members of the clutch.

It is the purpose of the present invention to improve the construction and mode of operation of the elements forming such automatic clutches, more particularly with respect to the method of operation of the centrifugal elements and also to simplify the construction in various respects.

For a better understanding of the invention, reference may be had to the accompanying drawings, in which—

Fig. 3 is a radial cross-section through the release spring arrangement, as seen along the line 3—3 of Fig. 2;

Fig. 4 is an enlarged radial section through the centrifugal mechanism, as seen along the line 4—4 of Fig. 2;

Fig. 5 is a section through a modified form of the clutch body, as seen along the line 5—5 of Fig. 6;

Fig. 6 is a face view thereof; and

Fig. 7 is a radial section through the driving stud arrangement, as seen along the line 7—7 of Fig. 6.

Figure 1:
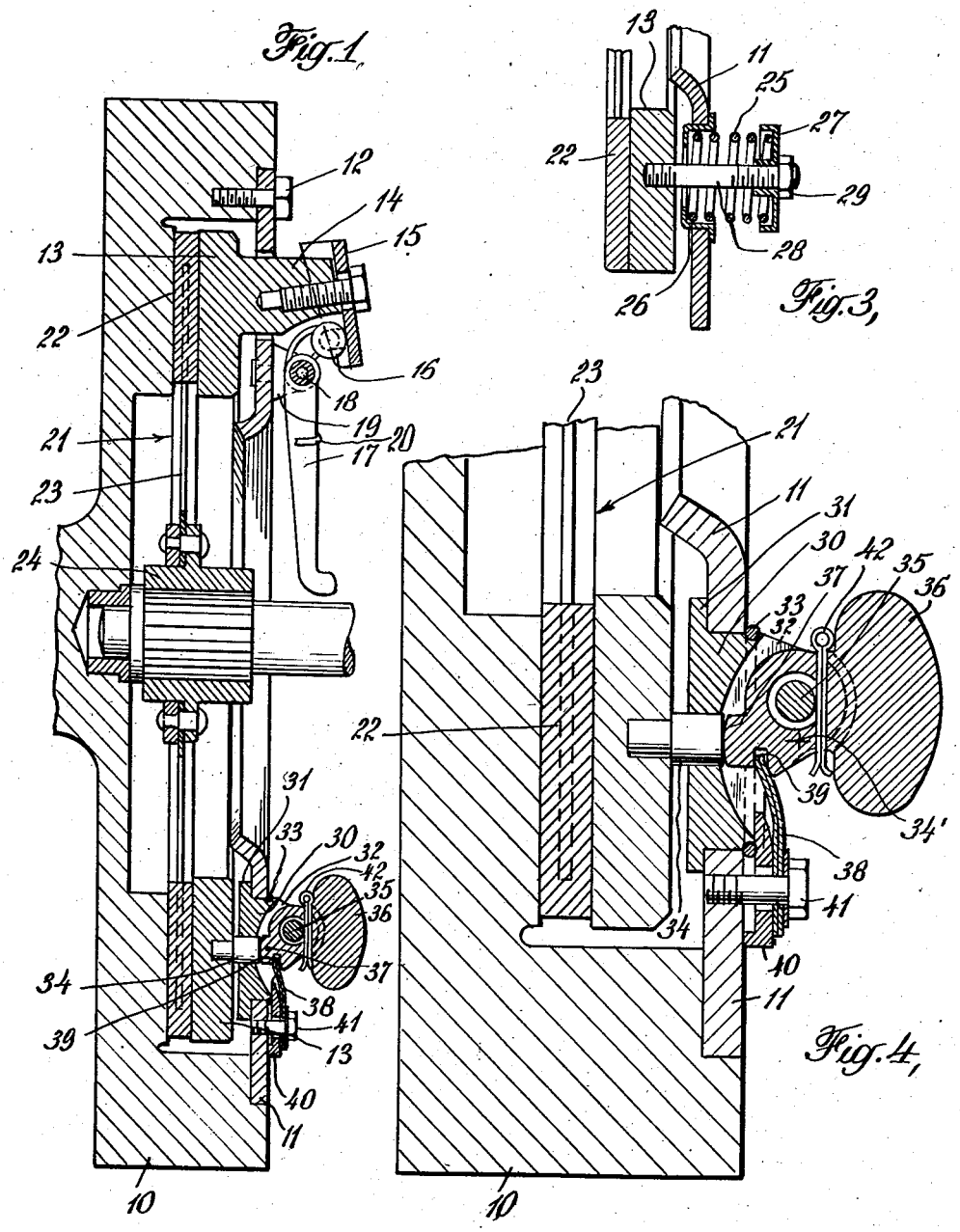
Fig. 1 is a cross-section through the new automatic clutch of this invention, as seen along the line 1—1 of Fig. 2.

In Fig. 1 of these drawings, numeral 10 designates the fly-wheel of the automobile engine, to which the master plate 11 of the clutch is secured by stud screws or bolts 12 in the usual way. This master plate 11 is provided with three openings, spaced equidistantly, through which pass the lugs 14 of the presser plate 13, these studs serving as the driving connection between the rotating master plate 11 and the presser plate 13.

Secured to the outer ends of studs 14 are the inverted channel-shaped guide plates 15, on the under surface of which roll the spool rollers 16, journalled on the free ends of release levers 17, which are pivoted on pins 18 mounted on yokes 19 secured to the master plate 11. Spring clips 20, shown especially in Fig. 2, engage the tops of the levers 17, pass around one projecting grooved end of the corresponding pivot pins 18 to act as keepers therefor, and engage the surface of master plate 11 with their other ends, whereby the levers 17 are pressed inwardly so that their rollers 16 are held against the guide plates 15 and no rattling or vibration due to looseness results.

Movement of the free ends of levers 17 inwardly about their pivot pins 18 by the usual clutch release mechanism, not shown, causes rollers 16 to press outwardly on their guide plates 15 with increasing force while rolling thereon so that the presser plate 13 is lifted from the friction transmitting element 21 to release it from the face of the fly-wheel 10.

This friction transmitting element 21 comprises a friction ring or mat 22 suitably mounted on a supporting disc or spider 23 connected to the hub 24, which is splined on the jack shaft leading to the transmission, not shown. This friction transmitting element may be of any conventional form, as may the presser plate, release levers and master plate. In fact, any clutch to which the arrangement of this invention may be adapted may be used with equal facility.

The new arrangement of this invention departs from conventional clutch design in the clutch spring arrangement and the pressure-producing mechanism. In the specific form of the invention illustrated in Fig. 2, three such springs 25 are employed, one adjacent each of the three release levers 17. As shown in the sectional view in Fig. 3, each of these springs 25 is seated at its inner end in a cup 26, opening outwardly and set in an opening in the master plate 11. The outer end of the spring 25 is seated in another cup 27 threaded on a stud 28 passing through the center of the spring and screwed into the presser plate 13. This outer spring cup 27 is positioned by screwing it along the threaded stud 28 and is locked in any desired position by a nut 29 also threaded on the stud 28. By screwing the cup 27 and the lock nut 29 down on the stud 28 the compression of spring 25 may be increased and, when the lock nut 29 is loosened and the cup 27 backed off, the compression of spring 25 is decreased. The compressions of the springs 25 may be adjusted to be equal or they may be adjusted to be unequal, as required.

It will be observed that, instead of forcing the presser plate 13 into contact with the transmitting element friction ring 22 in the usual way, springs 25 have the opposite effect, i. e., they tend to withdraw the presser plate 13 out of contact with the friction ring 22 to release the clutch, and this released condition of the clutch obtains when the clutch is rotating slowly or not rotating, as will be explained later. It will also be observed that the springs 25 aid the action of release levers 17, so that little pressure on the clutch pedal is required to release the clutch at any normal operating speeds of the engine.

Figure 2:
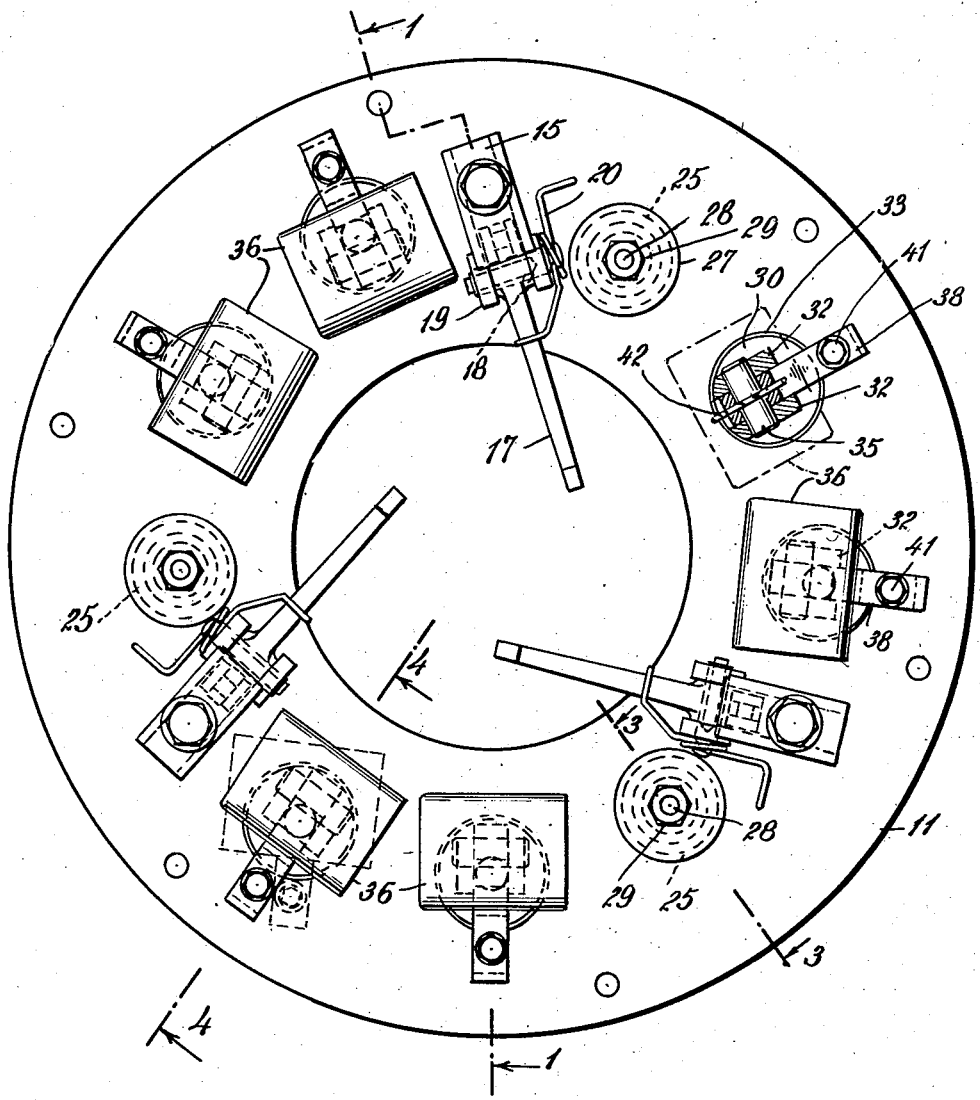
Fig. 2 is a face view of the new clutch.

A pair of circular apertures are located in the master plate 11 between each pair of release levers and springs, making three spaced pairs or sets of adjacent apertures in the master plate, as seen in Fig. 2. Snugly fitted in each of these apertures is a bushing 30 having a flange 31 on one side and a pair of lugs or ears 32 on the opposite side. Each bushing 30 is held in place in the master plate by the flange 31 on one side and the wire ring 33 sprung in a groove on the other side.

Thrust pins 34, suitably secured in the presser plate 13, extend through a center opening in each of the bushings 30 and project slightly above the bottom of a recess milled out of the bushing 30 between the lugs or ears 32, as shown especially in enlarged Fig. 4.

Offset radially from the thrust pin 34 and extending between the lugs or ears 32 of each of the bushings 30 is a pivot pin 35. Pivoted on this pivot pin 35 is the centrifugal weight 36, having the offset cam 37, which engages the thrust pin 34. The center of curvature of this cam 37 preferably lies at the point of intersection 34' of the projected center lines of the thrust pin 34 and the pivot pin 35, so that any outward movement of the weight 36 about its pivot pin 35 causes the cam 37 to exert a pressure on the thrust pin 34. Conversely, this eccentric relationship between the weight 36 and the pivot pin 35, while allowing the use of lighter weights, permits the weight to return to normal position and release the pressure of cam 37 on thrust pin 34 when the speed of rotation of the clutch is reduced below a predetermined speed or stopped.

As above referred to, it will be seen that the springs 25 (see Fig. 3) operate to cause disengagement of the clutch elements, (that is the driving and driven elements) when the engine slows down and the centrifugal elements are retracted; and in such movement the springs 25 act through the presser plate and the thrust pins 34 to assist in forcing the centrifugal weights back to normal position. The weights are then held in this normal position, bearing against the thrust pins, by the action of the springs 38.

A laminated leaf spring 38, inserted at one end in a curved notch 39 in the weight 36 and anchored at its other end on a plate 40 secured to the master plate 11 by screw 41, retards movement of the weight 36 in either direction sufficiently to prevent it from vibrating or rattling either at low or high speeds.

A split pin 42, passing through the weight 36 and a continuous circular groove on pivot pin 35 positively holds the latter in properly centered yet floating position, without requiring the use of nuts or screws, which are likely to require periodic inspection or tightening.

Although the weights 36 are shown mounted exactly radially on the master plate 11, their bushings 30 may be turned slightly to the master plate as shown in Fig. 2 so that the positions of the weights 36 vary from the exact radial position to have a different pressure producing effect and may be regulated to employ either centrifugal or inertia forces, or both, as desired.

The new clutch illustrated in Figs. 1 to 4, inclusive, when mounted on the fly-wheel 10 in the usual way, is normally disengaged when the engine is not running or is idling below a predetermined speed, because the springs 25 hold the presser plate 13 withdrawn from the friction transmitting element 21 so that the latter is not driven. The operator of the vehicle therefore may engage the clutch automatically by simply depressing the throttle to increase the speed of the engine above the predetermined idling speed. This results in more rapid rotation of the clutch and then the centrifugal force due to this more rapid rotation causes weights 36 to move outwardly about their pivots 35, so that their cams 37 press on the thrust pins 34 with sufficient force to compress springs 25 and move presser plate 13 progressively into pressing contact with friction ring 22 of transmitting element 21. The transmitting element 21 is accordingly driven to move the vehicle at any speed previously selected and, as the speed of the engine increases, the centrifugal force of weights 36 increases proportionately, whereby the frictional pressure of the clutch is also increased proportionately. Accordingly, at high engine speeds the clutch friction is at its maximum holding capacity so that no slippage occurs, while at low speeds the pressure is lighter so that some slippage may occur.

It is for this reason that the engine cannot stall with the new clutch, the latter automatically relieving the load on the engine as the engine slows down in response to the increased load. For example, if the brakes of the automobile are applied suddenly as for an emergency stop, whereby an overload on the engine is imposed suddenly so that it is liable to stall, the decreasing speed of the engine reduces the centrifugal force of rotation of the clutch, so that the weights 36, assisted by the springs 38, retract because of their eccentric arrangement and relieve the pressure on the presser plate 13, which in turn releases the friction member 22. The clutch then slips slightly to reduce the overload on the engine, so that it has an opportunity to recover without stalling.

When the engine again speeds up in consequence of this automatically reduced load, the weights 36 again move outwardly in response to the increased speed of rotation to positively reengage the clutch. Thus, the clutch automatically compensates for load fluctuations and reduces the strain on the engine transmission and driving gear, and the clutch also gets the maximum power out of the engine by automatically balancing the applied load against the capacity of the engine at any instant.

This anti-stalling action of the clutch is also of considerable advantage when the engine is cold, inasmuch as, when the engine is inclined to stall under these conditions, the clutch automatically hunts the proper clutching speed to reduce any overload on the engine which is greater than its capacity until the engine is warmed and running efficiently.

Again, if the brakes of the automobile are applied suddenly, as when a traffic light flashes against the vehicle, the engine does not stall for reasons heretofore described and, if the throttle is then released the consequent slowing down of the engine causes the weights 36 to automatically disengage the clutch so that the operator does not have to depress his clutch pedal to shift gears when again starting off.

When the vehicle is traveling along and the operator desires to let the car coast of its own momentum, he need only release the throttle and momentarily depress the clutch pedal to retract the weights and disengage the clutch. If the operator continues to depress the clutch pedal, the noticeable reduction of the clutch pedal resistance will indicate that the clutch is fully disengaged in response to the reduced speed of rotation of the engine. The operator may then release the clutch pedal and still retain the declutched effect as long as road conditions permit and may even come to a full stop without exercising any manual effort such as disengaging the clutch and the like. The operator may then also shift gears at will without manually disengaging the clutch. When the operator again wishes to have positive control of the running gear, it is only necessary for him to depress the throttle to speed up the engine, whereupon the clutch automatically re-engages in the manner described.

Referring now to the modified form of the new automatic clutch of this invention, illustrated by Figs. 5, 6 and 7, it will be seen that it differs from the arrangement just described in that each of the release levers 17' is mounted upon or is a part of a pivoted weight 36'. Accordingly, operation of the levers 17' by the clutch pedal releases the pressure of weight cams 37' from the thrust pins 34' to permit the springs 25' to lift presser plate 13' from the friction ring 22. Conversely, any movement of the weights 36' due to inertia and centrifugal force also moves the levers 17' as if they were operated manually. Accordingly, there is no separate or direct connection between the release levers and the presser plate, whereby the connections between the ends of the levers 17' and the guide plates 15 of the arrangement of Fig. 1 are eliminated, and the levers 17' may be radial instead of tangential, since the long lever arm is not necessary. In this way the clutch is made lighter and of fewer parts, although additional separate weights may be used in conjunction with the combined lever weights 17'—36' if required. Also, the studs 14' which connect the presser plate 13' to the master plate 11' are shorter, as shown in Fig. 7, and serve only as driving connections between them and have no other function.

The operation of this modified form of clutch illustrated in Figs. 5, 6 and 7 is precisely like the operation of the first form of the clutch, except that the manual power required to release the clutch when the engine is running at higher speeds is considerably less, because the levers 17' act directly to manually oscillate the weights 36' to release their cams 37' from thrust pins 34', instead of acting through the presser plate studs 14 and presser plate 13 back through the cams 37 of the weights 36, as in the arrangement shown in Figs. 1 to 4, inclusive. Moreover, there is far less liability of misappropriation of the clutch control by the automatic arrangement when the engine is overaccelerated in first and second speeds, since the direct action of the release levers 17' on the weights 36' releases the cams 37' of the latter immediately and without requiring any considerable degree of force on the clutch pedal.

This modified form of the clutch also acts the same as the clutch first described when the operator releases the throttle to decrease the speed of the engine with respect to the speed of the vehicle.

It will be seen that the new clutch provides many new advantages and improvements over the conventional forms of clutches in providing a means for automatically balancing the load imposed on the engine against the instantaneous capacity of the engine by changing the pressure of the clutch in accordance with the speed of rotation thereof. In this way, the clutching action is regulated much more accurately to compensate for any overload conditions than is possible with direct manual clutch control, although the automatic action of the clutch is directly controllable by the throttle of the engine. Thus, by regulating the speed of the engine by means of the throttle, the operator automatically regulates the clutching action to procure the proper transfer of power from the engine to the driving mechanism of the vehicle without manually operating the clutch directly. Also, the automatic action of the clutch relieves any undue strain under severe operating conditions and prevents stalling of the engine and slipping of the clutch at high speeds inasmuch as under full power of the engine the safety factor or torque holding capacity is very substantially increased over that of the conventional form of clutch.

Inasmuch as the new clutch automatically balances the engine power with the road resistance of the vehicle at any one instant, the proper tractive effort is secured for the vehicle at all times, so that it is possible to start the vehicle and accelerate or decelerate under any operating conditions without undue spinning of the driving wheels or stalling of the engine, which is a great advantage provided by the new clutch and not possible with conventional designs of clutches.

I claim:

In a clutch, the combination of a driving member, a driven member, and a presser plate connected to the driving member and adapted to frictionally engage the driven member to drive the same; of centrifugal elements carried by said driving member, certain of said elements being adjustable to different positions away from a radial direction of the driving member, for providing variable centrifugal effects; and operative connections between said centrifugal elements and said presser plate.

ELMER V. J. TOWER.